United States Patent [19]

Ono

[11] Patent Number: 5,604,599
[45] Date of Patent: Feb. 18, 1997

[54] SERIAL PRINTING FACSIMILE APPARATUS

[75] Inventor: Takeshi Ono, Kawasaki, Japan

[73] Assignee: Canon Kabushiki Kaisha, Tokyo, Japan

[21] Appl. No.: 287,415

[22] Filed: Aug. 9, 1994

[30] Foreign Application Priority Data

Aug. 24, 1993 [JP] Japan .................. 5-209396

[51] Int. Cl.$^6$ .................................................. H04N 1/21
[52] U.S. Cl. ............................................. 358/296; 347/2
[58] Field of Search ................................ 346/37, 38, 39; 347/2, 37, 38, 39; 358/296, 300, 302

[56] References Cited

U.S. PATENT DOCUMENTS

| | | | |
|---|---|---|---|
| 5,072,304 | 12/1991 | Abe et al. | 358/296 |
| 5,158,379 | 10/1992 | Moriya et al. | 400/279 |
| 5,235,353 | 8/1993 | Hirano et al. | 347/37 |
| 5,354,136 | 10/1994 | Takizawa et al. | 347/37 |

FOREIGN PATENT DOCUMENTS 3049597 3/1991 Japan.

Primary Examiner—Mark J. Reinhart
Attorney, Agent, or Firm—Fitzpatrick, Cella, Harper & Scinto

[57] ABSTRACT

A facsimile apparatus includes a serial printer which performs printing head initialization for exact and reliable printing, which is important in facsimile apparatuses where printing cannot be retried. For this purpose, in stand-by status, the printing head is held at a stand-by position, and upon printing, the printing head is moved in a main-scanning direction while a recording sheet is shifted in a subscanning direction. The facsimile apparatus comprises a detector for detecting the presence/absence of the printing head at the stand-by position, a receiver for receiving a printing start signal, and a controller for, when the printing start signal is received by the receiver, performing the initialization by moving the printing head to the stand-by position based on a detected result by the detector.

17 Claims, 6 Drawing Sheets

SERIAL PRINTING FACSIMILE APPARATUS

BACKGROUND OF THE INVENTION

The present invention relates to a facsimile apparatus employing a serial printing device that reciprocates a serial printing head in a main-scanning direction while shifting a recording sheet in a subscanning direction.

Conventionally, various facsimile apparatuses comprising a printer of a serial printing method have been introduced. In these facsimile apparatuses, if an ink-jet printing head is employed as the printing head, cleaning/recovery operation is performed at predetermined intervals in order to avoid poor ink-discharging by the printing head. However, the period between the cleaning/recovery operations is very long, e.g., once in several days.

Further, these apparatuses do not perform any preprinting function, such as preparation for printing operation, by moving the carriage that holds the printing head. Also, these apparatuses do not perform functions related to moving the carriage before printing.

On the other hand, in a case where the serial printer drives the carriage by a step motor, driving load is the greatest when starting to drive the carriage from a home position. This causes insufficiency of torque at the step motor. Especially, if the time the carriage is held is prolonged, the driving becomes impossible.

One of reasons for the driving impossibility is non-printing status for a long period. This shifts the position of a rotor with respect to a stator within the step motor from an excited phase of an exciting signal for the step motor. Normally, the latest excited phase of the stopped step motor is maintained until the next exciting signal is applied. When the step motor is stopped for many hours, the exciting signal is turned off in consideration of safety. Basically, if the exciting signal is turned off for hours, the motor phase may be shifted for some reason, and in this case, the shifted phase does not correspond to the start point of the next exciting signal. This results in synchronization error status where the step motor cannot operate in synchronization with the exciting signal.

Another reason for a driving impossibility from a mechanical standpoint is a slight deformation and/or burr at a guide shaft for conveyably guiding the carriage or at a contact portion between the carriage and the guide shaft. In this case, the carriage might be settled on the guide shaft at a position where greater torque is required for driving the carriage.

In a case where the printing head mounted on the carriage is an ink-jet head, a capping operation at a carriage stand-by position is necessary to prevent drying of ink. However, long unused status increases the carriage driving load and cap-removing load by drying of ink, fixing of ink, evaporation of ink, further, cap-removal operation.

Further, as the period during which the carriage is stationary at the home position without any printing operation becomes longer, the change of environment around the apparatus must be considered. For example, temperature and humidity may affect change amount of mechanical deformation for driving the carriage, ink-drying/evaporation amount, and drying of grease at an carriage moving portion, further, load-increasing amount caused by waterdrops. Especially, in a facsimile apparatus which is often used in an "operatorless" state, careful study addressing this problem due to the above-mentioned causes is necessary.

That is, for example, upon starting printing after a long idle period, the load increased by the above causes results in synchronization error between the step motor and the exciting signal, due to torque insufficiency, so that the printing point is shifted or even printing becomes impossible.

If an operator is near the facsimile apparatus, as in normal printing operation or copying operation, the operator can deal with the printing-impossible status or poor printing, by retrying printing, and the problem is at most a waste of paper. However, if the apparatus is used in mode where printing cannot be retried, e.g., facsimile automatic-reception mode in which an automatically-received image is printed, the reception cannot be retried. In this case, the above statuses are not negligible any longer.

In some conventional printers, an initial operation of the carriage is performed upon turning on the power, and if the carriage does not move to the home position, an error indication and instruction for removing the error are displayed.

However, in a case where a serial printing device is used as a printer of a facsimile apparatus, the power of the facsimile apparatus is always on (stand-by), and in many cases the apparatus starts operatorless printing. For this reason, the error display is not useful.

In a printer using serial printing method, the power is turned on at every time it is used, therefore slight shift of the carriage is adjusted at this power-on operation. However, as mentioned above, a facsimile apparatus is always on, therefore, the shift of the carriage cannot be adjusted, and the shift may increase until it can be ignored no longer.

SUMMARY OF THE INVENTION

Accordingly, the present invention has been made in consideration of the above situation, and has as its object to provide a facsimile apparatus, comprising a serial printer, which performs printing exactly and reliably in mode characteristic to facsimile apparatuses such as automatic-reception mode in which printing cannot be retried.

Another object of the present invention is to provide a facsimile apparatus, having a home position sensor for detecting a carriage position, which moves a printing head or a carriage holding the printing head upon receiving a printing start signal, to prevent carriage-driving impossible status and to ensure an exact printing start position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

Preferred embodiments of the present invention will be described in detail in accordance with the accompanying drawings.

Figure 1:
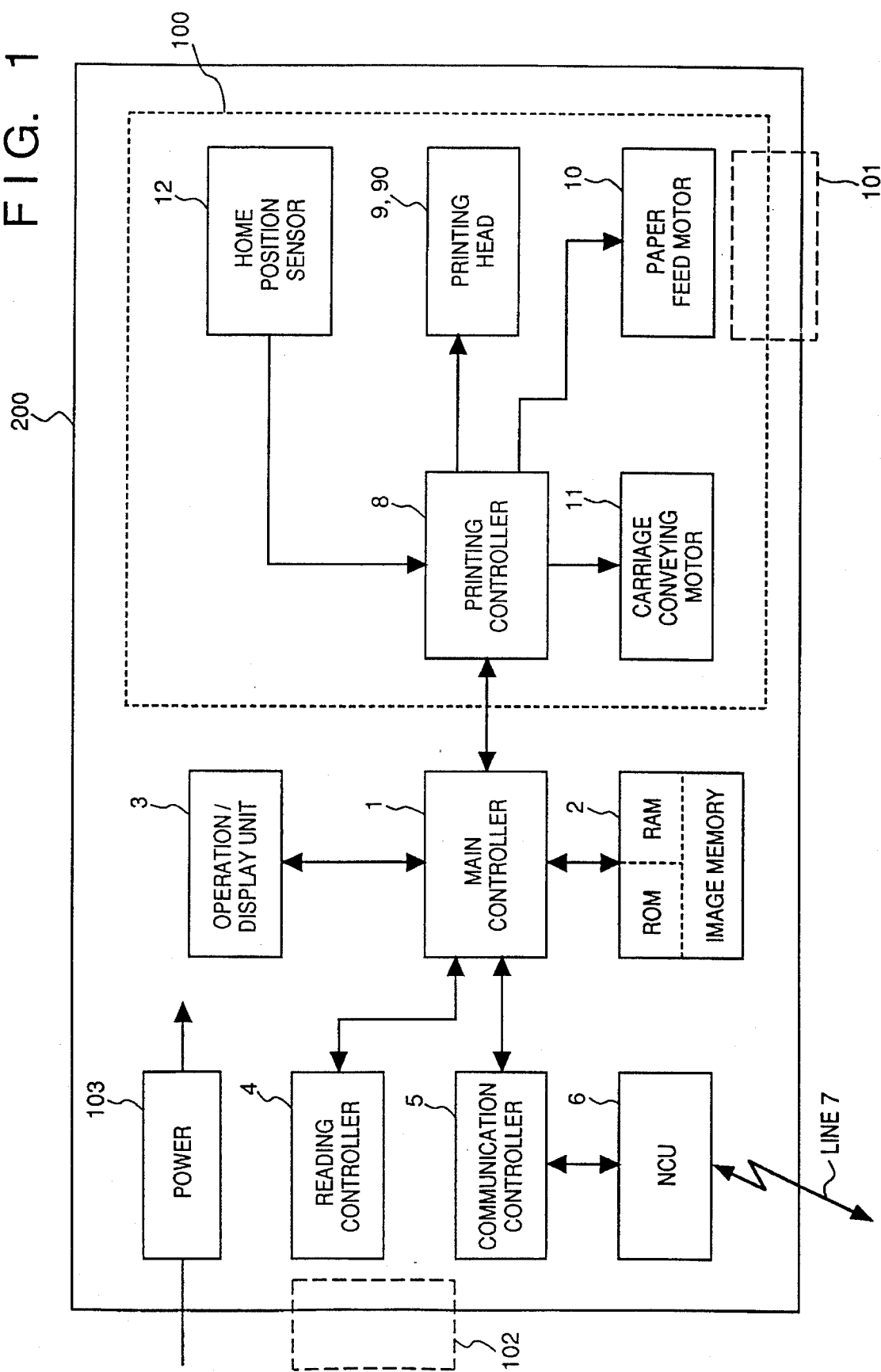
FIG. 1 is a block diagram showing the configuration of a facsimile apparatus according to an embodiment of the present invention.

FIG. 1 shows the configuration of a facsimile apparatus according to an embodiment of the present invention. In FIG. 1, a facsimile apparatus 200 has a power source 103 which is always supplied with electric power, for always supplying electricity at a predetermined level to respective elements. An original document for transmission is placed on an original platen 102, represented by a broken line, and conveyed by a printing medium conveying device under predetermined control of a reading controller 4. A recording sheet cassette 101 containing a plurality of recording sheets is detachably provided at the facsimile apparatus 200 so as to supply the recording sheets one by one to a serial printer 100. The serial printer 100, represented by a broken line, is connected to a main controller 1 via a printing controller 8. The main controller 1, comprising a CPU for controlling the overall apparatus, is connected to an image memory 2 having a ROM and a RAM, and an operation/display unit 3 having a display comprising an LCD/LED and an input device such as key switches.

The main controller 1 is further connected to a reader (not shown) comprising a CCD, CS (contact sensor) and the like, and the reading controller 4 for controlling the printing medium conveying device. Upon facsimile transmission or copying, image data read under the control of the reading controller 4 is stored in the image memory 2. Further, the main controller 1 is connected to a communication controller 5 comprising a modem or the like, connected to an NCU (network control unit) 6. The NCU 6 is connected to a line 7, to enable communication with external apparatuses.

In the above construction, upon facsimile transmission, read image data is transmitted via the communication controller 5—the NCU 6—the line 7, while upon reception, image data is received via the line 7—the NCU 6—the communication controller 5, and stored into the image memory 2.

As shown in FIG. 1, the serial printer 100 comprises, as mechanical elements, a printing head 9 of ink-jet printing type or a thermal head 90 of thermal printing type connected to the printing controller 8, a paper feed motor 10 as the printing medium conveying device, a carriage conveying motor 11, and a home position sensor 12 for detecting the carriage home position.

The home position sensor 12, comprising a photo sensor of photo-interrupter type or photo-reflector type, is turned on when the carriage is at the stand-by position, while turned off when the carriage is out of the stand-by position. This sensor is used for carriage initialization to be described later.

Figure 2:
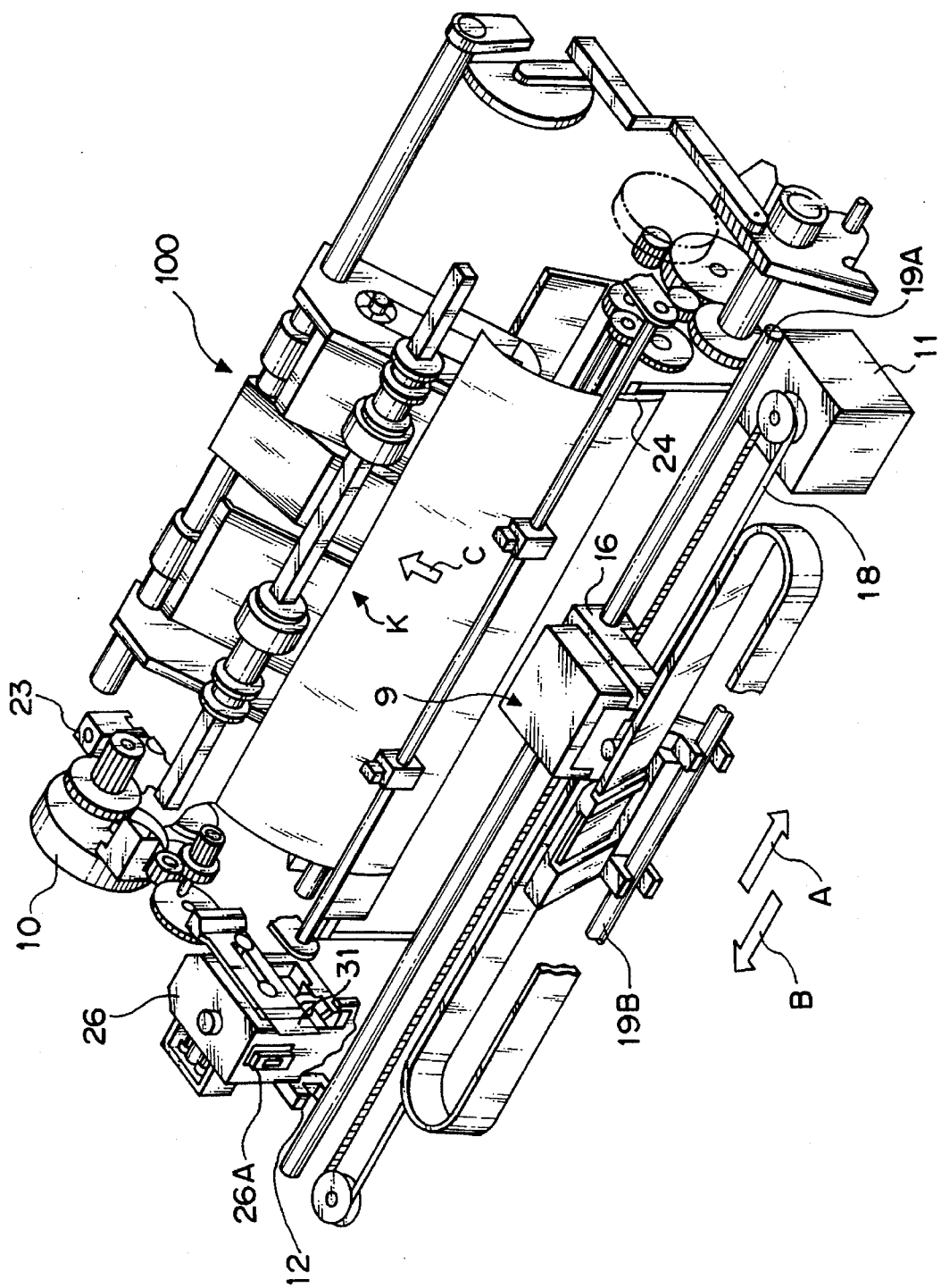
FIG. 2 is a perspective view showing the construction of a serial ink-jet printer of the facsimile according to the embodiment.

FIG. 2 is a perspective view of the mechanical elements of the serial printer 100. The elements shown in FIG. 1 have the same reference numerals and the explanations of these elements will be omitted, and other elements of the printer 100 will be described.

A carriage 16, for holding the printing head 9 having a cartridge, is belt-driven in directions as represented by arrows A and B. For this purpose, a timing belt 18 is provided between a pulley at an output shaft of the carriage motor 11 and an idler pulley, and the carriage 16 is held in the pathway of the belt. As shown in FIG. 2, the carriage 16 is held by carriage guide shafts 19A and 19B slidably in the arrow A and B directions. The serial printing head is thus formed with these elements.

The paper feed motor 10 for conveying a recording sheet K is connected to a conveying roller via a transmission mechanism 23, and the motor 10 performs subscanning by shifting the recording sheet K after every main-scanning for one line in a direction represented by an arrow C.

The recording sheet K conveyed in this manner is supplied to a portion opposing to the printing head 9, and is held by a platen 24.

On the other hand, as the printing head 9 is an ink-jet head, it has a recovery unit 26, a head cap 26A provided at this element and a wiping blade 31 for wiping surplus ink, respectively arranged as shown in FIG. 2. The recovery unit 26 performs recovery operations on the ink-jet heads such as capping for preventing drying of ink, idle-discharging and sucking for preventing ink-jet nozzles from being filled with ink, and wiping after the idle-discharging/sucking operation.

In the above construction, printing is performed such that the printing head 9 is reciprocated in the arrow A and B directions (main-scanning direction) while the recording sheet K is stepwisely moved in the arrow C direction (subscanning direction). In a case where printing is not performed for many hours, the stand-by position of the printing head 9 is set to the position of the recovery unit 26. The home position sensor 12 comprising a photo interrupter or the like is arranged around the recovery unit 26. When the carriage 16 is located at the stand-by position, the home position sensor 12 is turned on to detect the position of the carriage 16.

In this embodiment, the carriage 16 is conveyed by the timing belt 18, however, the present invention is not limited to this arrangement. For example, the carriage 16 may be driven by a lead screw. In this case, the guide shaft 19A is replaced with a lead screw with a spiral groove on its circumferential surface, and the lead screw is directly rotated by the carriage motor 11 in the arrow A and B directions.

Figure 3:
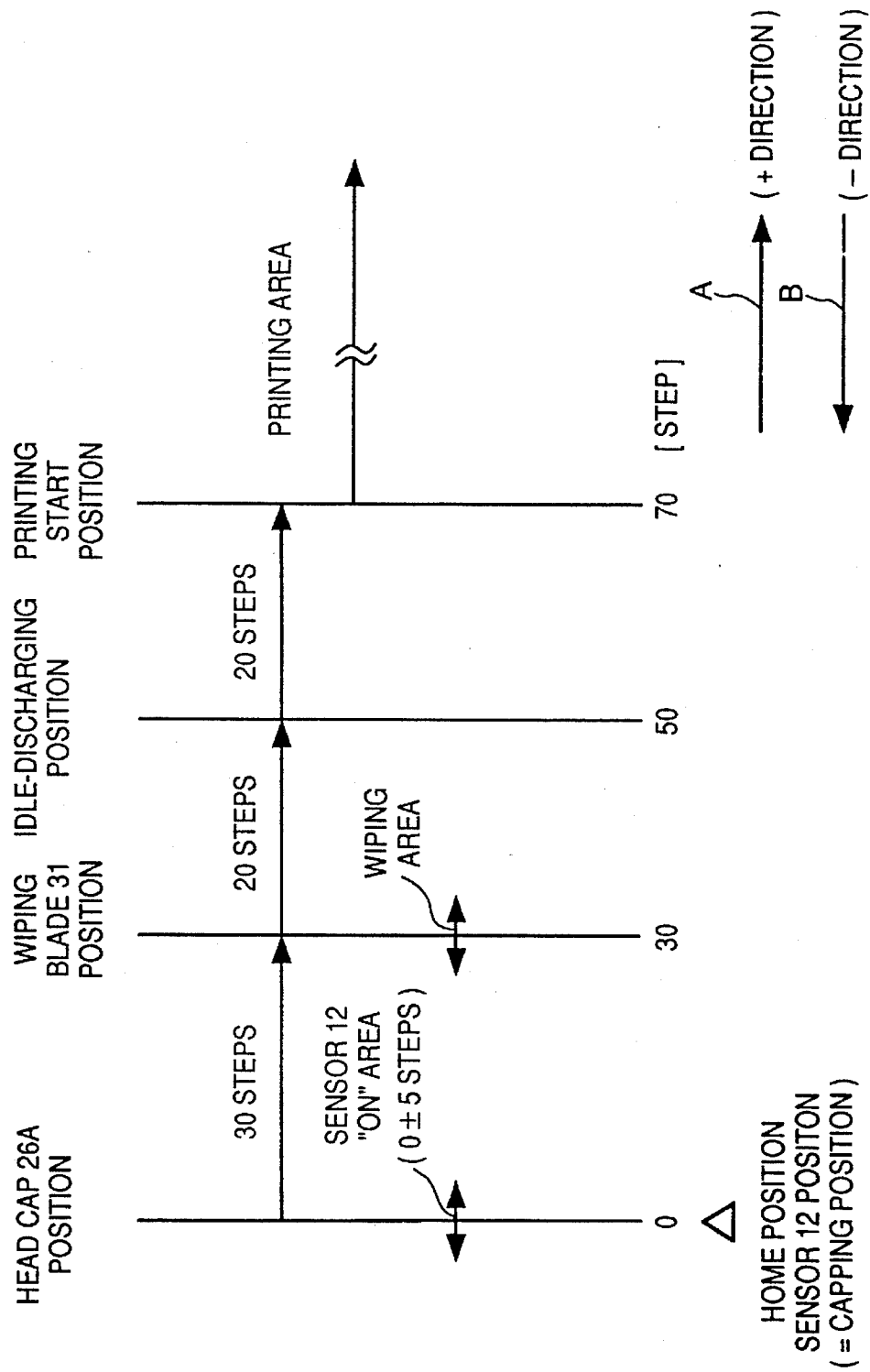
FIG. 3 illustrates positional relation among mechanical elements in the printer.

FIG. 3 shows an example of positional relation among the mechanical elements. In FIG. 3, a position at "0" step of the carriage motor 11 is the capping position, and the home position sensor is arranged at this position. The home position sensor 12 is turned on when the carriage 16 is positioned at the "0" step to "0±5" steps. This "0" step position is the left margin of the moving range of the carriage 16, i.e., the carriage 16 cannot move leftward beyond this left margin.

Next, a position at "30" steps is the position where the wiping blade 31 is provided, and the wiping range (wiping surplus ink) corresponds to "30±5" steps. The position at "50" steps is the idle-discharging position, where an ink-absorbing member is arranged opposing to the ink-discharging surface of the printing head 9. The position at "70" steps is the printing start position. A printing area starts from this position in a direction represented by an arrow A ("+" direction). Note that the direction represented by an arrow B is "−" direction.

Figure 4:
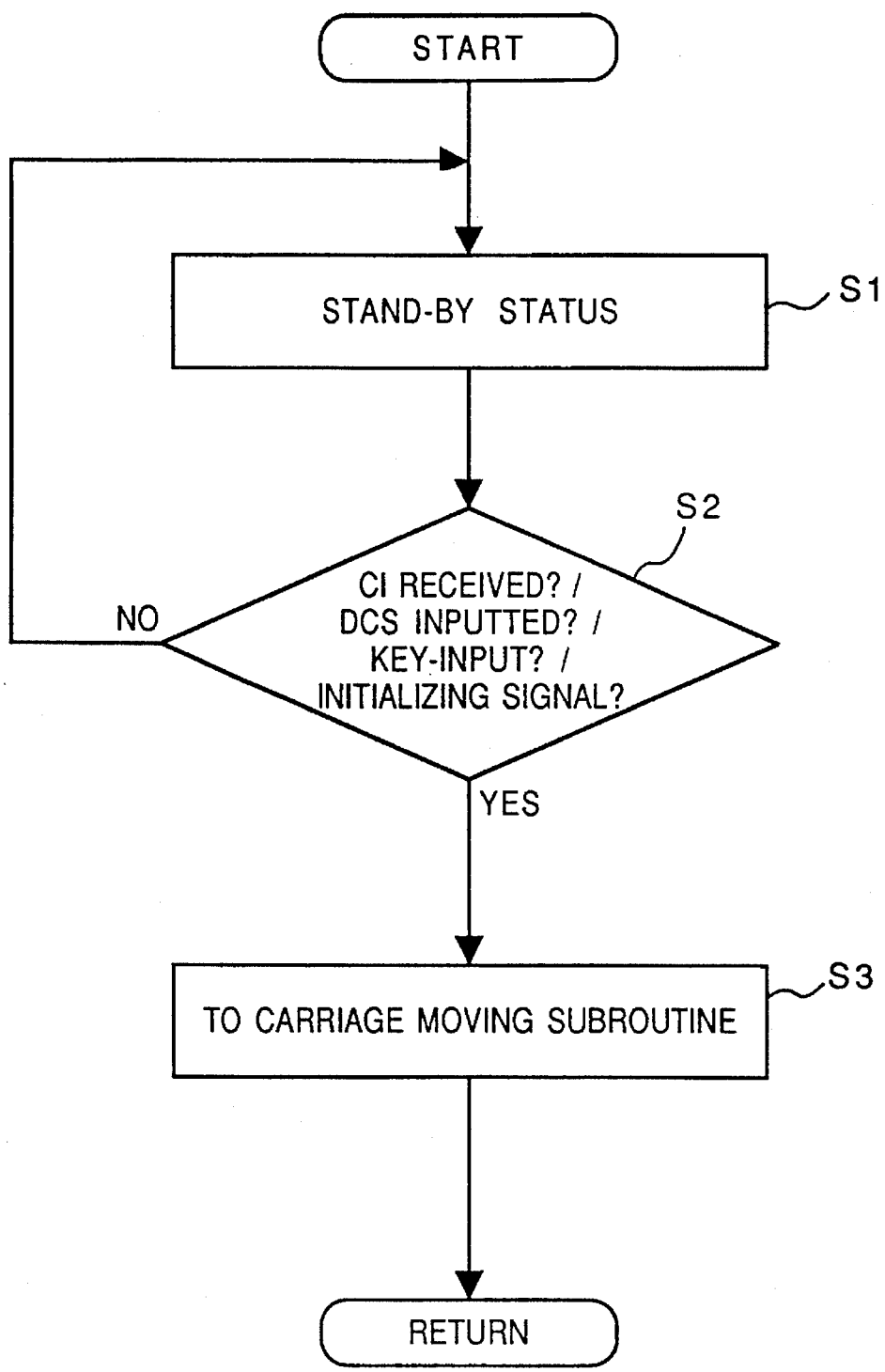
FIG. 4 is a flowchart showing the operation of the embodiment.

FIG. 4 is a flowchart showing the operation of the facsimile apparatus, having the above construction, that moves the carriage before it starts printing. Basically, this carriage moving operation is made by driving the carriage motor by a predetermined number of steps where the home position sensor 12 is turned off and then inverse-driving the carriage motor by the same steps to confirm that the home position sensor 12 is turned on.

In FIG. 4, when the power of the facsimile apparatus is turned on, the apparatus comes into stand-by status in step S1. In step S2, whether or not a CI (communication information signal) has been received, whether or not a DCS (data communication signal) has been inputted, whether or not there has been key-input from the operation/display unit 3, and whether or not an initializing signal for using the facsimile apparatus as a printer has been generated, is respectively determined. If YES in any of these determinations, the process proceeds to step S3, in which a subroutine for moving the carriage to prevent driving-impossibility at printing start time is executed.

In step S2, if NO in all the determinations, i.e., it is determined that any of input of the signals and key-input has not been made, the process returns to step S1 where the apparatus comes into the stand-by status again.

Figure 5:
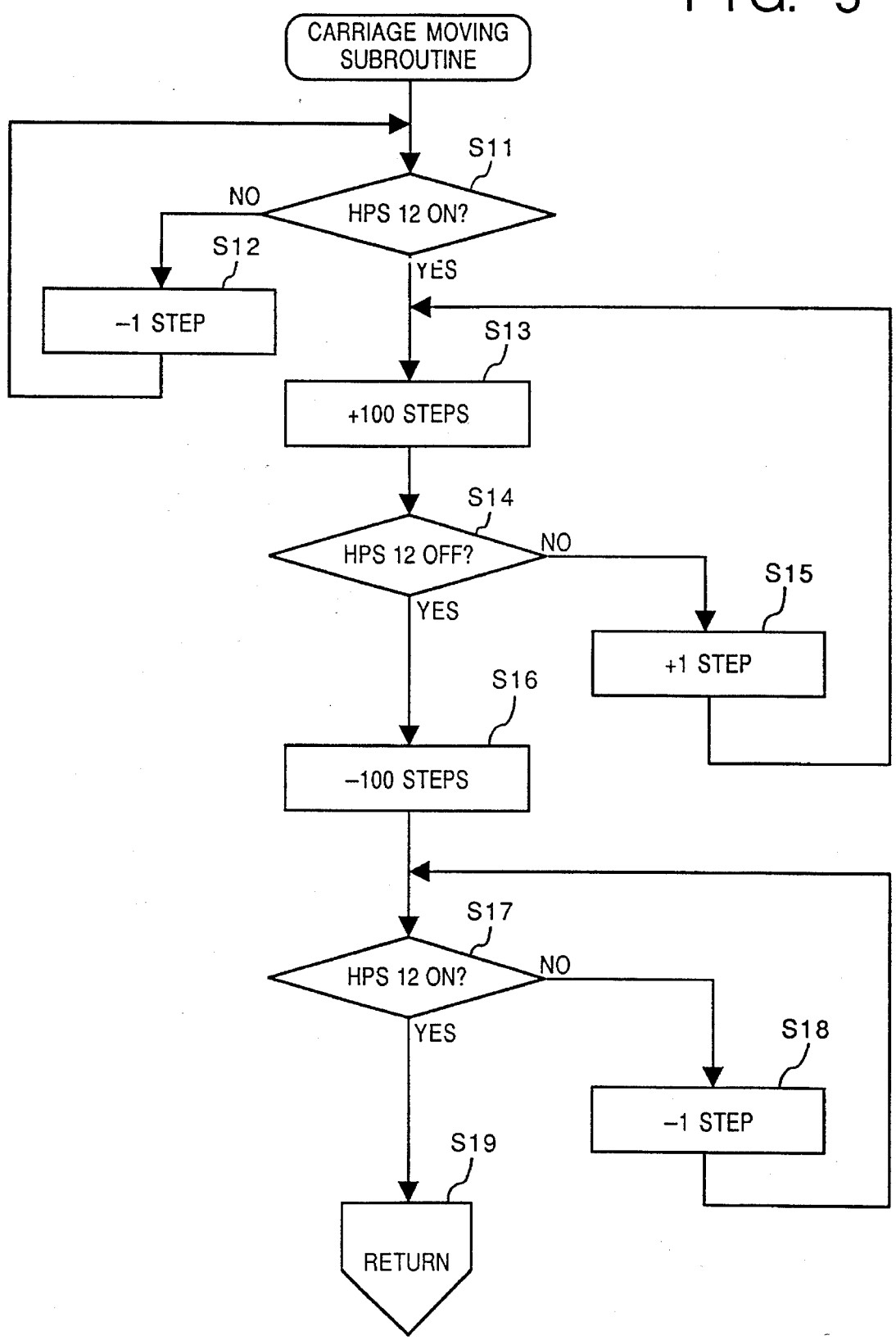
FIG. 5 is a flowchart showing a subroutine for carriage initialization.

FIG. 5 is a flowchart showing the subroutine of the carriage moving operation to prevent carriage driving trouble. When the process in FIG. 4 advances to the subroutine in FIG. 5, whether the home position sensor (HPS) 12 is on or not is determined in step S11.

In this step S11, the status of the home position sensor 12 is basically on, however, if the position of the carriage 16 is shifted by some reason, the process proceeds to step S12, in which the carriage motor 11 is driven by "−1" step. In this manner, confirming the home position sensor 12 status in step S12 is repeated, and when the home position sensor 12 status becomes on, the process proceeds to step S13. Since the home position sensor 12 is positioned at the left margin of the carriage moving range, the home position sensor 12 status is turned on by moving the carriage in the "−" (minus) direction.

As the home position sensor 12 status becomes on in step S11, the process proceeds to step S13, in which the carriage motor 11 is driven by 100 steps in the "+" (plus) direction, then proceeds to step S14, in which whether the home position sensor 12 is off or not is determined. If NO, it is considered that erroneous operation of the step motor 11 such as out-of synchronization of the motor 11 with an exciting signal has occurred. In this case, the process proceeds to step S15, the exiting start phase is changed by adding one step to the driving the motor 11 and the process returns to step S13, and these operations are repeated. Then, in step S14, if the home position sensor 12 status becomes off, the process proceeds to step S16, in which the carriage motor 11 is rotated by 100 steps in the "−" direction to return the carriage 16 to the home position.

Thereafter, in step S17, whether or not the home position sensor 12 status has become on is determined, and if YES, the process proceeds to step S19, in which the process returns from the subroutine to the main routine. On the other hand, if NO in step S17, i.e., the home position sensor 12 status is not on, the carriage motor 11 is rotated by one step in the "−" direction while the home position sensor 12 is monitored until the home position sensor 12 status becomes on.

It should be noted that the present embodiment gives the number of steps for driving the carriage motor and the number of steps at positional relation among the mechanical elements/operations as one example, and these values are arbitrary.

Further, the flowchart of FIG. 5 showing the carriage moving operation is a subroutine called when the condition in the flowchart in FIG. 4 is satisfied. However, this subroutine may be called upon reception of a key-input signal as well as the above condition. When the main controller detects pressing of a copy key or pressing of a start key, the main controller outputs the key-input signal. Otherwise, the subroutine may be called when an original document sensor (not shown) detects an original.

These conditions are provided on the apparatus so as to perform the carriage moving operation immediately before printing or upon determining the possibility of printing. Further, in a case where the apparatus is always on without carriage initialization operation, the carriage moving operation may be performed after every printing operation to correct the carriage stop position. This effectively avoids increase of carriage position shift amount.

In the embodiment, the main controller 1 and the printing controller 8 are separate controllers, however, the main controller 1 may perform all the controls including the monitoring of the home position sensor 12 and the carriage moving operation.

FIG. 2 shows the mechanical construction for driving the carriage motor using the timing belt, however, as mentioned above, the motor drive may be performed using a lead screw. Moreover, any serial printing mechanism which has a carriage (head) stand-by position and performs printing by reciprocating the carriage in a main-scanning direction is applicable.

In the embodiment, the printing head is an ink-jet head which requires capping and idle-discharging, however, the present invention is not limited to the ink-jet printing head. The printing head may be, e.g., a thermal head.

In the embodiment, the home position sensor 12 is provided at the capping position for the printing head 9, however, the home position sensor 12 may be positioned anywhere within the printing area, as long as the number of steps from the capping position to the home position sensor 12 is fixed. Further, the capping position, the wiping position, the idle-discharging position and the printing start positions may be arbitrarily set. In the embodiment, the position of the home position sensor 12 is on the printer main body side, however, this position may be on the carriage side. Changing the home position sensor 12 position changes the carriage moving operation and also changes the number of steps for moving the carriage.

As described above, the facsimile apparatus according to the present invention performs the carriage moving operation upon receiving a signal indicative of printing start or a signal indicative of possibility of printing, thus preventing synchronization error at the carriage motor at the next printing start time after a long interval since the carriage stopped at the home position or the capping position. Further, the apparatus performs carriage moving operation as initialization during the interval between the reception of a printing start signal and the reception of the next printing start signal, thus performing printing without time loss.

A facsimile apparatus where the power is always turned on may preferably perform the carriage moving operation after each printing. This avoids increase of carriage stand-by position shift amount and prevents shifting of printing start position or home position detection error.

Figure 6:
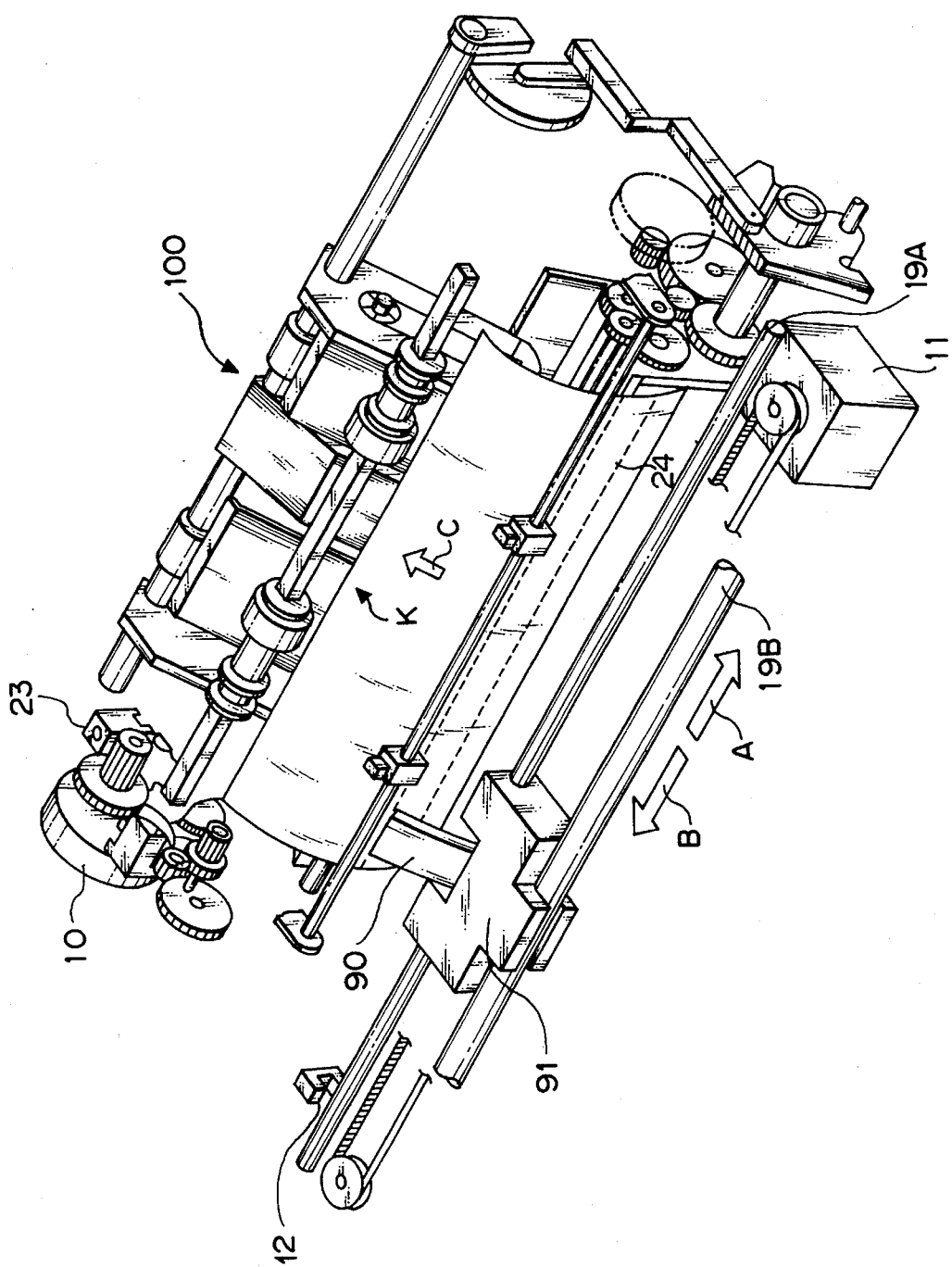
FIG. 6 is a perspective view showing the construction of a thermal printer of serial printing method according to the embodiment.

FIG. 6 is a perspective view showing an example where a thermal printer is employed as the printer. In FIG. 6, the elements shown in FIG. 2 have the same reference numerals and the explanations of these elements will be omitted. The elements different from the construction in FIG. 2 will be described. A carriage 91, moved by the step motor 11 in arrow A and B directions, holds a thermal head 90 having a thermal head print/idle shifting mechanism (not shown). The recording sheet K is a thermal transfer sheet in the form of a roll, shifted by the paper feed motor 10, by one-line, on the platen 24 represented by a broken line in an arrow C direction. This construction omits a capping device to be provided around the home position sensor 12.

As described above, the carriage initialization operation enables a facsimile apparatus which comprises a thermal printer of serial printing type having the above construction to perform printing operation exactly and reliably.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus having a serial printer which holds a printing head at a stand-by position in stand-by status of the apparatus and performs serial printing by moving the printing head in a main-scanning direction while shifting a recording sheet in a subscanning direction upon a printing operation, said apparatus comprising:

a communication controller for communicating with external apparatuses;

a first controller for judging if said communication controller received a receiving signal among image data:

a detector for detecting presence/absence of the printing head at the stand-by position; and a second controller for, when the receiving signal among image data is judged to have been received by said first controller, performing initialization by moving the printing head to the stand-by position based on a detected result by said detector.

2. The facsimile apparatus according to claim 1, wherein the receiving signal is either of a CI (communication information) signal, and a DCS (data communication signal).

3. The facsimile apparatus according to claim 1, wherein said serial printer reciprocates the printing head in back-and-forth directions by step motor driving, and performs the initialization by moving the printing head from an area detected by said detector toward a printing area by forward step-motor driving by a predetermined number of steps, then moving the printing head from the printing area by backward step-motor driving by the predetermined number of steps.

4. The facsimile apparatus according to claim 3, wherein when said detector detects absence of the printing head at the stand-by position, said printer moves the printing head by backward step-motor driving by one step until said detector detects presence of the printing head at the stand-by position.

5. The facsimile apparatus according to claim 3, wherein after the forward step-motor driving, if said detector detects the presence of the printing head at the stand-by position, said printer moves the printing head by forward step-motor driving by a number of steps one-step more than the predetermined number of steps until said detector detects absence of the printing head at the stand-by position.

6. The facsimile apparatus according to claim 3, wherein after the backward step-motor driving, if said detector detects the absence of the printing head at the stand-by position, said printer moves the printing head by backward step-motor driving by a number of steps one-step fewer than the predetermined number of steps until said detector detects presence of the printing head at the stand-by position.

7. A facsimile apparatus having a serial printer which holds a printing head at a stand-by position in stand-by status of the apparatus and performs serial printing by moving the printing head in a main-scanning direction while shifting a recording sheet in a subscanning direction upon a printing operation, said apparatus comprising:

a communication controller for communicating with external apparatuses;

a first controller for judging if said communication controller received a receiving signal among image data;

a detector for detecting presence/absence of the printing head at the stand-by position; and a second controller for, when the receiving signal among image data is judged to have been received by said first controller, performing initialization by moving the printing head to the stand-by position based on a detected result by said detector, wherein said serial printer moves the printing head by a forward step-motor driving by a predetermined number of steps, thereafter, moves the printing head by a backward step-motor driving by the predetermined number of steps, and wherein upon the forward and backward step-motor drivings, said detector detects presence/absence of the printing head at the stand-by position, and in accordance with the detected result by said detector, said printer performs initialization by moving the printing head by forward or backward step-motor driving by one step.

8. The facsimile apparatus according to claim 7, wherein said serial printer performs the initialization by moving the printing head by the forward step-motor driving by a predetermined number of steps, so that the printing head is moved from an area detected by said detector toward a printing range, then moving the printing head by the backward step-motor driving by the predetermined number of steps so that the printing head is moved from the printing range, wherein when said detector detects absence of the printing head at the stand-by position, said printer moves the printing head by a backward step-motor driving by one step until said detector detects presence of the printing head at the stand-by position;

further wherein after the forward step-motor driving, if said detector detects the presence of the printing head at the stand-by position, said printer moves the printing head by forward step-motor driving by a number of steps one-step more than the predetermined number of steps until said detector detects absence of the printing head at the stand-by position;

and wherein after the backward step-motor driving, if said detector detects the absence of the printing head at the stand-by position, said printer moves the printing head by backward step-motor driving by a number of steps one-step fewer than the predetermined number of steps until said detector detects presence of the printing head at the stand-by position.

9. The facsimile apparatus according to claim 7, wherein the receiving signal is either of a CI (communication information) signal, and a DCS (data communication signal).

10. A facsimile apparatus having a serial printer which holds a printing head at a stand-by position in stand-by status of the apparatus and performs serial printing by moving the printing head in a main-scanning direction while shifting a recording sheet in a subscanning direction upon a printing operation, said apparatus comprising:

- a communication controller for Communicating with external apparatuses:
- a first controller for judging if said communication controller received a receiving signal among image data;
- a detector for detecting presence/absence of the printing head at the stand-by position; and
- a second controller for, when the receiving signal among image data is judged to have been received by said first controller, performing initialization by moving the printing head to correct a position of the printing head after a predetermined printing operation has been completed.

11. A facsimile apparatus having a serial printer which holds an ink-jet printing head at a stand-by position in stand-by status of the apparatus and performs serial ink-jet printing by moving the ink-jet printing head in a main-scanning direction while shifting a recording sheet in a subscanning direction upon printing operation, said apparatus comprising:

- a communication controller for communicating with external apparatuses;
- a first controller for judging if said communication controller received a receiving signal among image data;
- a detector for detecting presence/absence of the ink-jet printing head at the stand-by position based on a predetermined margin; and
- a second controller for, when the receiving signal among image data is judged to have been received by said first controller, performing initialization by moving the ink-jet printing head to the stand-by position based on a detected result by said detector,
- wherein said serial printer moves the printing head by a forward step-motor driving by a predetermined number of steps, thereafter, moves the printing head by a backward step-motor driving by the predetermined number of steps,
- and wherein upon the forward and backward step-motor drivings, said detector detects presence/absence of the printing head at the stand-by position, and in accordance with the detected result by said detector, said printer performs initialization by moving the printing head by forward or backward step-motor driving by one step.

12. The facsimile apparatus according to claim 11, wherein said serial printer performs the initialization by moving the printing head by the forward step-motor driving by a predetermined number of steps, so that the printing head is moved from an area detected by said detector toward a printing range, then moving the printing head by the backward step-motor driving by the predetermined number of steps so that the printing head is moved from the printing range,

- wherein when said detector detects absence of the ink-jet printing head at the stand-by position, said printer moves the ink-jet printing head by backward step-motor driving by one step until said detector detects presence of the ink-jet printing head at the stand-by position;
- further wherein after the forward step-motor driving, if said detector detects the presence of the ink-jet printing head at the stand-by position, said printer moves the ink-jet printing head by forward step-motor driving by a number of steps one-step more than the predetermined number of steps until said detector detects absence of the ink-jet printing head at the stand-by position;
- and wherein after the backward step-motor driving, if said detector detects the absence of the ink-jet printing head at the stand-by position, said printer moves the ink-jet printing head by backward step-motor driving by a number of steps one-step fewer than the predetermined number of steps until said detector detects presence of the ink-jet printing head at the stand-by position.

13. The facsimile apparatus according to claim 11, wherein the predetermined number of steps is set for moving the ink-jet printing head to positions for capping, wiping, and idle-discharging, to be performed on an ink-discharging portion of the ink-jet printing head, and to a printing start position.

14. The facsimile apparatus according to claim 11, wherein the ink-jet receiving signal is either of a CI (communication information) signal, and a DCS (data communication signal).

15. A facsimile apparatus having a serial printer which holds a thermal printing head at a stand-by position in stand-by status of the apparatus and performs serial thermal printing by moving the thermal printing head in a main-scanning direction while shifting a thermal transfer sheet in a subscanning direction upon a printing operation, said apparatus comprising:

- a communication controller for communicating with external apparatuses;
- a first controller for judging if said communication controller received a receiving signal among image data;
- a detector for detecting presence/absence of the thermal printing head at the stand-by position based on a predetermined margin; and
- a second controller for, when the receiving signal among image data is judged to have been received by said first controller, performing initialization by moving the thermal printing head to the stand-by position based on a detected result by said detector,
- wherein said serial printer moves the printing head by a forward step-motor driving by a predetermined number of steps, thereafter, moves the printing head by a backward step-motor driving by the predetermined number of steps,
- and wherein upon the forward and backward step-motor drivings, said detector detects presence/absence of the printing head at the stand-by position, and in accordance with the detected result by said detector, said printer performs initialization by moving the printing head by forward or backward step-motor driving by one step.

16. The facsimile appartus according to claim 15, wherein said serial printer performs the initialization by moving the printing head by the forward step-motor driving by a predetermined number of steps, so that the printing head is moved from an area detected by said detector toward a printing range, then moving the printing head by the backward step-motor driving by the predetermined number of steps so that the printing head is moved from the printing range,

- wherein when said detector detects absence of the ink-jet printing head at the stand-by position, said printer moves the ink-jet printing head by backward step-motor driving by one step until said detector detects presence of the ink-jet printing head at the stand-by position;

further wherein after the forward step-motor driving, if said detector detects the presence of the ink-jet printing head at the stand-by position, said printer moves the ink-jet printing head by forward step-motor driving by a number of steps one-step more than the predetermined number of steps until said detector detects absence of the ink-jet printing head at the stand-by position;

and wherein after the backward step-motor driving, if said detector detects the absence of the ink-jet printing head at the stand-by position, said printer moves the ink-jet printing head by backward step-motor driving by a number of steps one-step fewer than the predetermined number of steps until said detector detects presence of the ink-jet printing head at the stand-by position.

17. The facsimile apparatus according to claim 15, wherein the thermal receiving signal is either of a CI (communication information) signal, and a DCS (data communication signal).

* * * * *